(12) United States Patent
Johnson et al.

(10) Patent No.: US 6,464,169 B1
(45) Date of Patent: Oct. 15, 2002

(54) OVERHEAD GALLEY/CREW REST FACILITY

(75) Inventors: Richard J. Johnson, Bothell; Richard Fraker, Edmonds; Wilbur J. Wong, Redmond, all of WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 09/916,695

(22) Filed: Jul. 27, 2001

(51) Int. Cl.⁷ .......................... B64D 11/04; B64D 11/00
(52) U.S. Cl. .................. 244/118.5; 244/118.6
(58) Field of Search ............... 244/118.5, 118.6

(56) References Cited

U.S. PATENT DOCUMENTS

| | | | | |
|---|---|---|---|---|
| 4,022,404 A | * | 5/1977 | Greiss .......................... | 186/40 |
| 4,055,317 A | * | 10/1977 | Greiss ....................... | 244/118.5 |
| 4,066,227 A | * | 1/1978 | Buchsel ...................... | 105/340 |
| 4,653,707 A | * | 3/1987 | Hamilton et al. ............ | 187/264 |
| 5,115,999 A | * | 5/1992 | Buchsel et al. ........... | 244/118.5 |
| 5,159,994 A | * | 11/1992 | Luria .......................... | 186/40 |
| 5,205,515 A | * | 4/1993 | Luria .......................... | 186/40 |
| 5,314,143 A | * | 5/1994 | Luria ....................... | 104/88.01 |
| 5,395,075 A | * | 3/1995 | Sprenger et al. ............. | 182/77 |
| 5,413,292 A | * | 5/1995 | Luria .......................... | 105/327 |
| 5,474,260 A | * | 12/1995 | Schwertfeger et al. ... | 244/118.5 |
| 5,992,797 A | * | 11/1999 | Seidel et al. ............. | 244/118.5 |
| 6,003,813 A | * | 12/1999 | Wentland et al. ......... | 244/118.5 |
| 6,073,883 A | * | 6/2000 | Ohlmann et al. ........... | 105/316 |
| 6,182,926 B1 | * | 2/2001 | Moore ...................... | 244/118.5 |
| 6,305,643 B1 | * | 10/2001 | Sankrithi ................. | 244/118.1 |
| 6,305,645 B1 | * | 10/2001 | Moore ...................... | 244/118.5 |

* cited by examiner

*Primary Examiner*—Charles T. Jordan
*Assistant Examiner*—Stephen A. Holzen
(74) *Attorney, Agent, or Firm*—Harness Dickey & Pierce P.L.C.

(57) ABSTRACT

An overhead galley/crew rest system for an aircraft, wherein the aircraft includes a main passenger cabin having a plurality of storage binds disposed along a generally planar ceiling portion thereof. The aircraft further includes an overhead storage section positioned generally above the ceiling portion of the main passenger cabin. The overhead galley/crew rest system includes a galley cart storage area disposed in this overhead storage section, which is capable of storing multiple galley carts. This galley cart storage area defines a generally planar cart plane. A walkway is provided that generally extends through the overhead storage section. The walkway is generally positioned between the plurality of storage binds and generally below the generally planar cart plane. A stairway interconnects the main passenger cabin and the walkway. Similarly, a cart lift mechanism interconnects the main passenger cabin to the overhead storage section for individually raising and lowering the plurality of galley carts. Furthermore, a plurality of sleeping berths and pursuer's's station may be included within this overhead storage section.

17 Claims, 8 Drawing Sheets

OVERHEAD GALLEY/CREW REST FACILITY

FIELD OF THE INVENTION

The present invention relates to aircraft and, more particularly, to a manually operated overhead galley and crew rest facility in an aircraft.

BACKGROUND OF THE INVENTION

As is well known in the art, modern long-range commercial aircraft often transport an enormous amount of food and beverages for consumption by the passengers of the aircraft. Typically, it is necessary to load enough food and beverages to feed hundreds of people at least two or more full meals during a single flight. However, it is not uncommon for this enormous amount of food and beverages, disposed in multiple galleys, to consume as much as 25% of the overall passenger cabin floor space. As should be readily apparent, such inefficient use of floor space leads to a reduction in the total number of passenger seating. This reduction in the total number of passenger seating results in significant loss of revenue for an airline.

Attempts have been made to provide automated systems that store galley carts off the main deck, thereby reducing the overall passenger cabin floor space used for food storage and increasing the number of passenger seating. However, these automated systems have not been well received due to the reliability and potential associated cost of maintaining any automated system. Additionally, many of these automated systems have not been well received due to the difficulty in maintaining their cleanliness.

Similarly, long-range commercial flights often require additional facilities for accommodating the flight crew during rest breaks. These facilities often include sleeping berths to enable various flight crew members or relief crews to sleep while in flight. These sleeping berths are typically placed on the main deck of the aircraft. As can be appreciated, such sleeping berths, like the galley carts, reduce the available passenger cabin floor space and, thus, reduce the number of passenger seating.

Accordingly, there exists a need in the relevant art to provide a device for maximizing the use of the passenger cabin floor space. Furthermore, there exists a need in the relevant art to provide an overhead galley for stowing galley carts during long-range flights. Still further, there exists a need in the relevant art to provide an overhead galley and crew rest facility to maximize passenger seating. Additionally, there exists a need in the relevant art to provide a manually accessible overhead galley and crew rest facility that overcomes the disadvantages of the prior art.

SUMMARY OF THE INVENTION

An overhead galley/crew rest system for an aircraft, wherein the aircraft includes a main passenger cabin having a plurality of storage binds disposed along a generally planar ceiling portion thereof. The aircraft further includes an overhead storage section positioned generally above the ceiling portion of the main passenger cabin. The overhead galley/crew rest system includes a galley cart storage area disposed in this overhead storage section, which is capable of storing multiple galley carts. This galley cart storage area defines a generally planar cart plane. A walkway is provided that generally extends through the overhead storage section. The walkway is generally positioned between the plurality of storage binds and generally below the generally planar cart plane. A stairway interconnects the main passenger cabin and the walkway. Similarly, a cart lift mechanism interconnects the main passenger cabin to the overhead storage section for individually raising and lowering the plurality of galley carts. Furthermore, a plurality of sleeping berths and pursuer's's station may be included within this overhead storage section.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
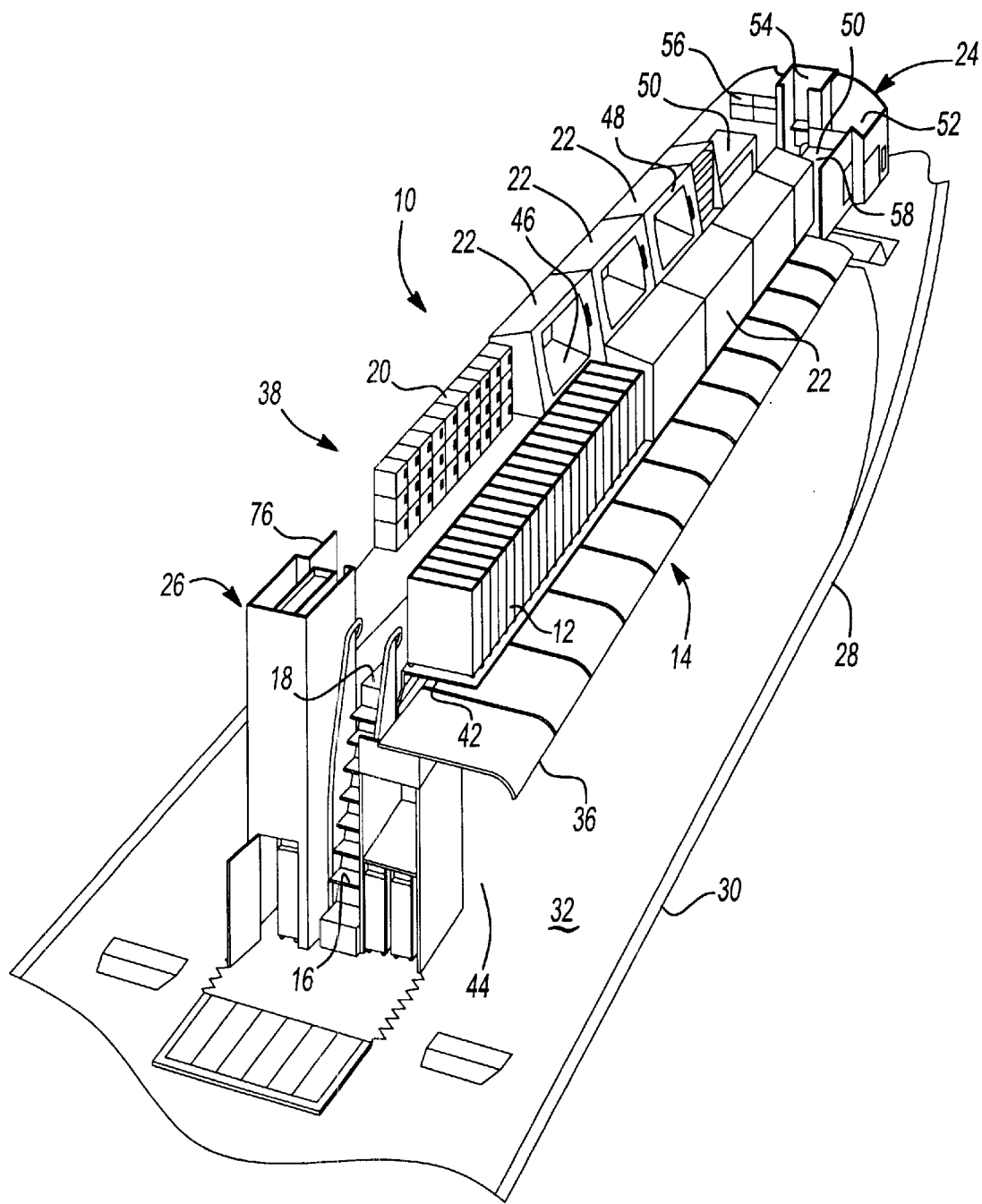
FIG. 1 is a perspective view illustrating an overhead galley/crew rest system according to a first embodiment of the present invention.

The following description of the preferred embodiments is merely exemplary in nature and is in no way intended to limit the invention, its application, or uses.

According to the principles of the present invention, a manually accessible overhead galley and crew rest facility is provided that is capable of relocating a plurality of galley carts and crew rest facilities from the main deck of the aircraft to a previously unused overhead section. Relocation of these galley carts and crew rest facilities provides additional space for passenger seating on the main deck of the aircraft. By way of non-limiting example, it has been realized that the present invention enables approximately twelve additional seats to be placed in an economy section of a Boeing 747-400.

Moreover, the manual accessibility of the manually accessible overhead galley and crew rest facility of the present invention eliminates the need for complex mechanisms that are typically used in unmanned galley facilities.

Referring to FIGS. 1–6, an overhead galley/crew rest system 10 is illustrated according to a first embodiment of the present invention. According to this embodiment, overhead galley/crew rest system 10 is capable of conveniently and reliably storing a plurality of conventional galley carts 12 in a galley cart storage area 14. Preferably, galley cart storage area 14 is refrigerated to provide proper food keep.

Overhead galley/crew rest system 10 further includes a stairway entry 16, an overhead walkway 18, a plurality of galley stowage modules 20, a plurality of sleeping berths 22, a pursuer's station 24, and a cart lift system 26, which are all disposed in an aircraft 28. Aircraft 28 includes a fuselage 30, a main deck 32, a plurality of center overhead storage bins 34, a main deck ceiling 36, and an overhead section 38. In conventional aircraft, overhead section 38 is typically not generally used for storage.

Figure 2:
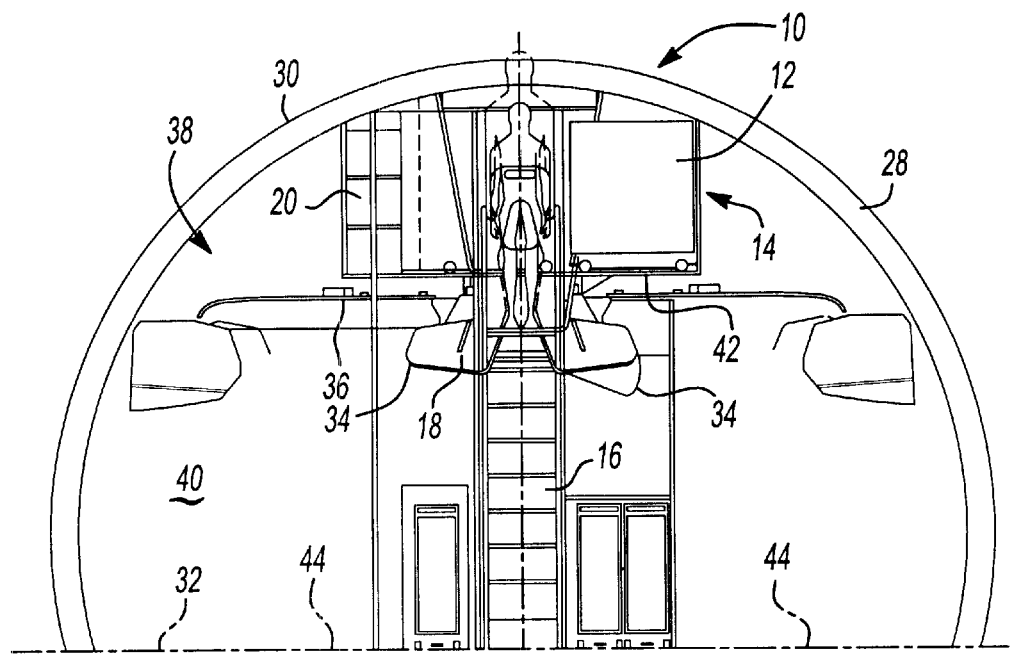
FIG. 2 is a partial cross-section view illustrating the overhead galley/crew rest system.

As best seen in FIG. 1, stairway entry 16 of overhead galley/crew rest system 10 generally extends from main deck 32 to overhead walkway 18. Stairway entry 16 is generally sized to permit safe and convenient ingress and egress to overhead section 38 by the flight crew. Referring now to FIG. 2, overhead walkway 18 is shown preferably disposed between center overhead storage bins 34 of main passenger cabin 40. That is, the walking surface of overhead walkway 18 is positioned below a galley cart support surface 42, upon which galley carts 12 are placed. Accordingly, such arrangement enables the available headroom of overhead walkway to be maximized while further maximizing the headroom of a pair of main cabin passenger walkways 44. However, it should be understood that the particular dimensions of overhead galley/crew rest system 10 might be easily changed depending on the customer's needs and/or preferences. Accordingly, depending on these dimensions, the overhead galley attendant could work either in a standing position or a seated position.

As illustrated in FIG. 1, the plurality of sleeping berths 22 are disposed on opposing sides of overhead walkway 18. The plurality of sleeping berths 22 each include a sleeping surface 46 and an optional enclosure panel 48. The occupant of the berth preferably manually slides optional enclosure panel 48 between a raised position and a lowered position. It should be appreciated that by positioning the plurality of sleeping berths 22 down past galley cart storage area 14 and galley stowage modules 20 enables galley carts 12 and the like to be accessed without disturbing crew in the crew rest facility.

Pursuer's station 24 preferably includes additional stacked berths 50, a workstation 52, an additional lavatory 54, and seating 56. Stacked berths 50 are of conventional design and are anticipated to add approximately four additional berths to a typical Boeing 747-400. However, as can be appreciated, stacked berths 50 may be eliminated should additional space is required for galley cart storage area 14. Workstation 52 of pursuer's station 24 preferably includes a desk surface 58 for use with writing, computing, or other general work duties.

Additional lavatory 54 includes a stool 60, sink 62, and other standard lavatory accommodations. Lavatory 54 is a dedicated crew lavatory that enables convenient access for crewmembers during rest breaks and the like.

Figure 4:
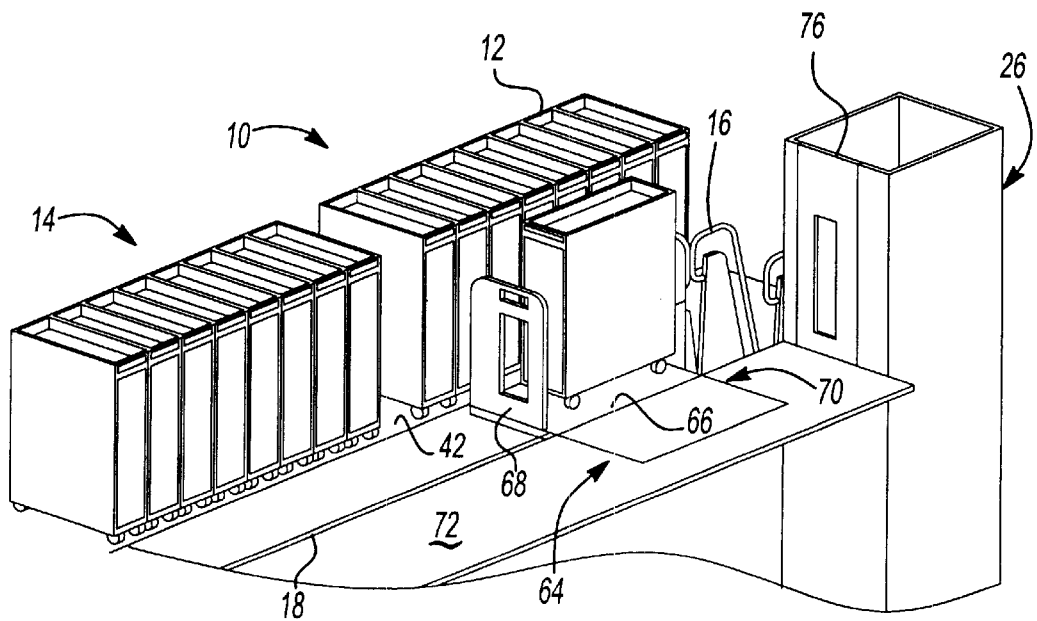
FIG. 4 is a perspective view illustrating a manual platform mechanism for transferring galley carts to a cart lift shown in a first position.
Figure 5:
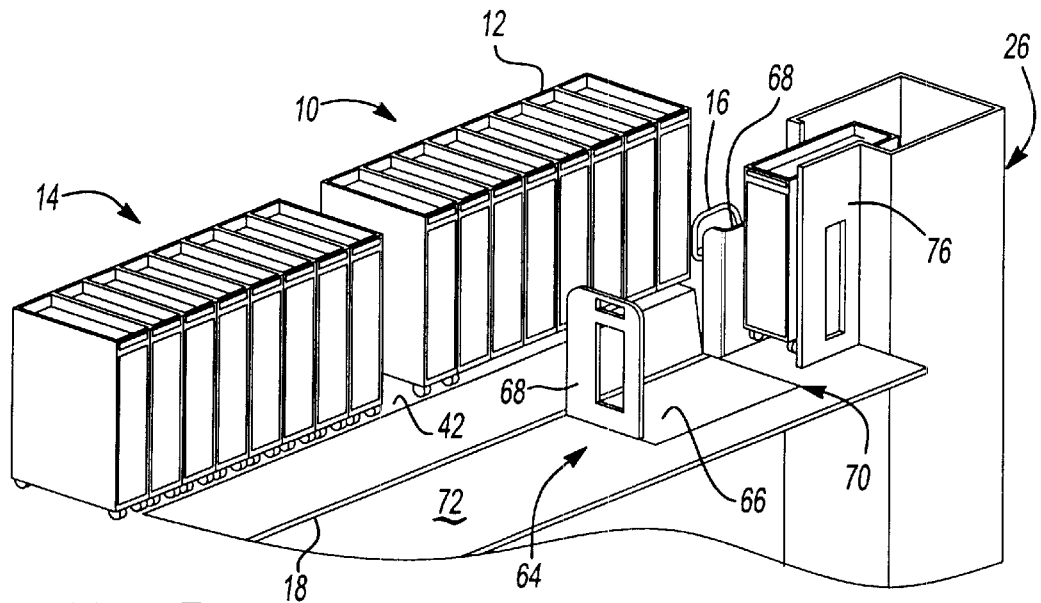
FIG. 5 is a perspective view illustrating the manual platform mechanism for transferring galley carts to a cart lift shown in a second position.
Figure 6:
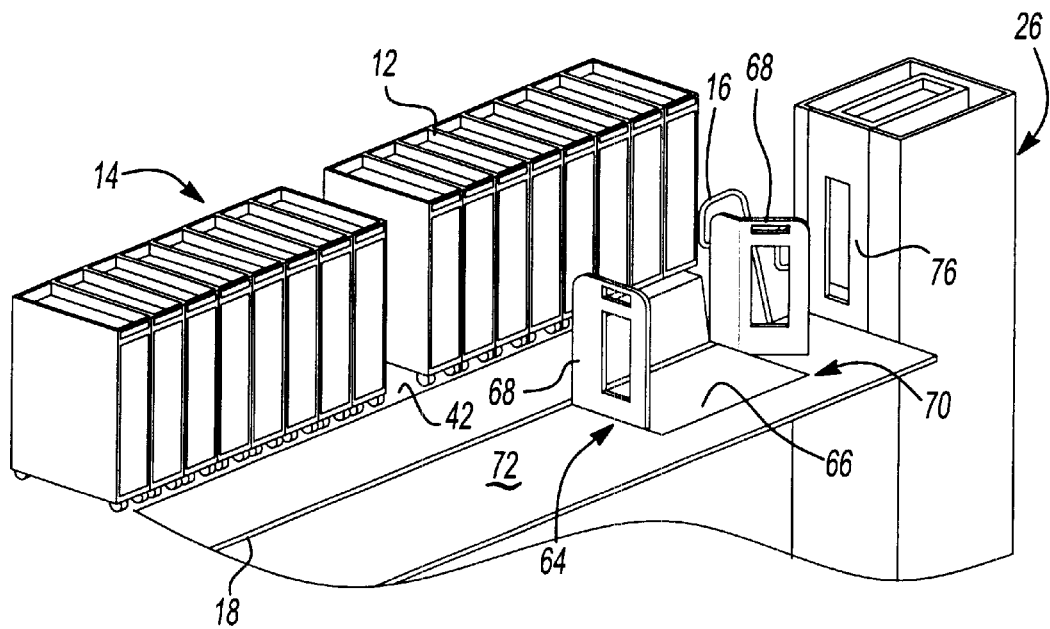
FIG. 6 is a perspective view illustrating the manual platform mechanism for transferring galley carts to a cart lift shown in a third position.

During operation, galley carts 12 are preferably stored in refrigerated galley cart storage area 14. Galley carts 12 would be locked down within galley cart storage area 14 in a conventional main deck means to inhibit damaging movement during flight. To facilitate raising and lowering galley carts 12 from overhead section 38 to main deck 32 of aircraft 28, cart lift system 26 is employed. Specifically, as best seen in FIGS. 4–6, to remove galley cart 12 from galley cart storage area 14, a manual platform mechanism 64 is employed. Manual platform mechanism 64 includes a base 66, a pair of sidewalls 68, and a laterally slidable mechanism 70, which is longitudinally slidably on rails 71. Base 66 generally is a flat platform for accommodating galley cart 12 thereon. Base 66 is disposed generally coplanar with a raised surface 72 of overhead section 38 and galley cart support surface 42 of galley cart storage area 14. Raised section 72 interfaces with a cart lift door 76 of cart lift system 26 to permit smooth and convenient rolling of galley cart 12 to cart lift system 26.

To this end, manual platform mechanism 64, normally disposed in raised section 72 on an opposing side of overhead walkway 18 from galley cart storage area 14, is manually slid such that base 66 is generally coplanar with galley cart support surface 42 of galley cart storage area 14 to define a relatively flat rolling surface that spans overhead walkway 18. Galley cart 12 is then unlocked from galley cart storage area 14 and manually rolled across to base 66 and locked to prevent rolling. Base 66 is then slid back to raised section 72 via laterally slidable mechanism 70. Once galley cart 12 is slid to raised section 72, one of the pair of sidewalls 68 is articulated to enable longitudinal rolling of galley cart 12. Cart lift door 76 of cart lift system 26 is opened to enable galley cart 12 to be rolled into cart lift system 26. Cart lift door 76 is then closed and galley cart 12 is lowered to main deck 32. The lowering of galley cart 12 via cart lift system 26 may be manual or automatic. That is, galley cart 12 may be lowered using a manual pulley system or an automated drive mechanism, such as a motor driven pulley or screw drive and the like. To raise galley cart 12 to overhead section 38, an opposite operation is performed.

Figure 7:
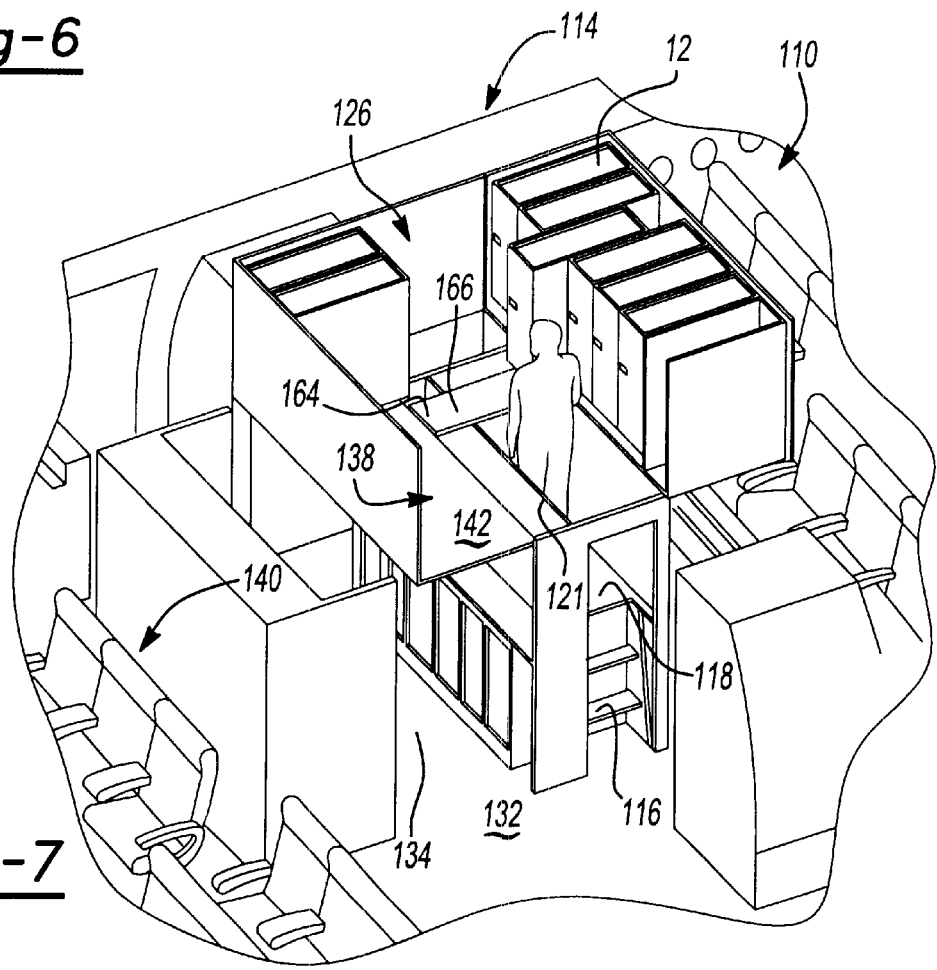
FIG. 7 is a perspective view illustrating an overhead galley/crew rest system according to an alternative embodiment of the present invention.
Figure 8:
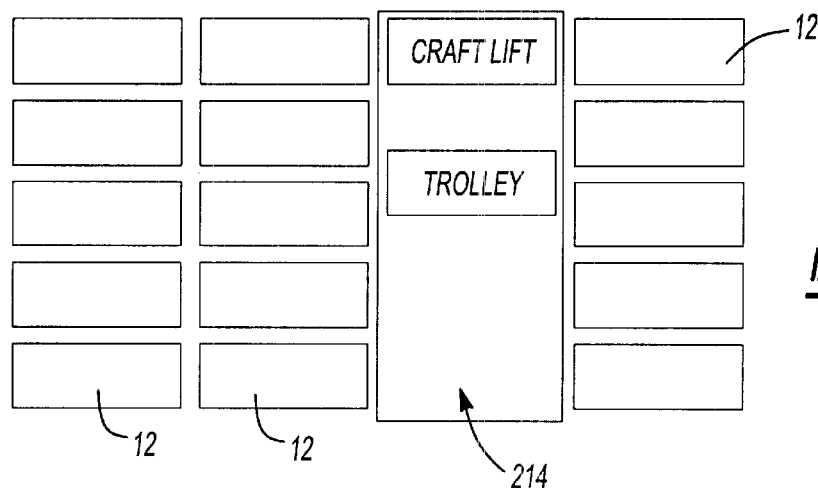
FIG. 8 is a schematic diagram illustrating an alternative galley cart storage method.
Figure 9:
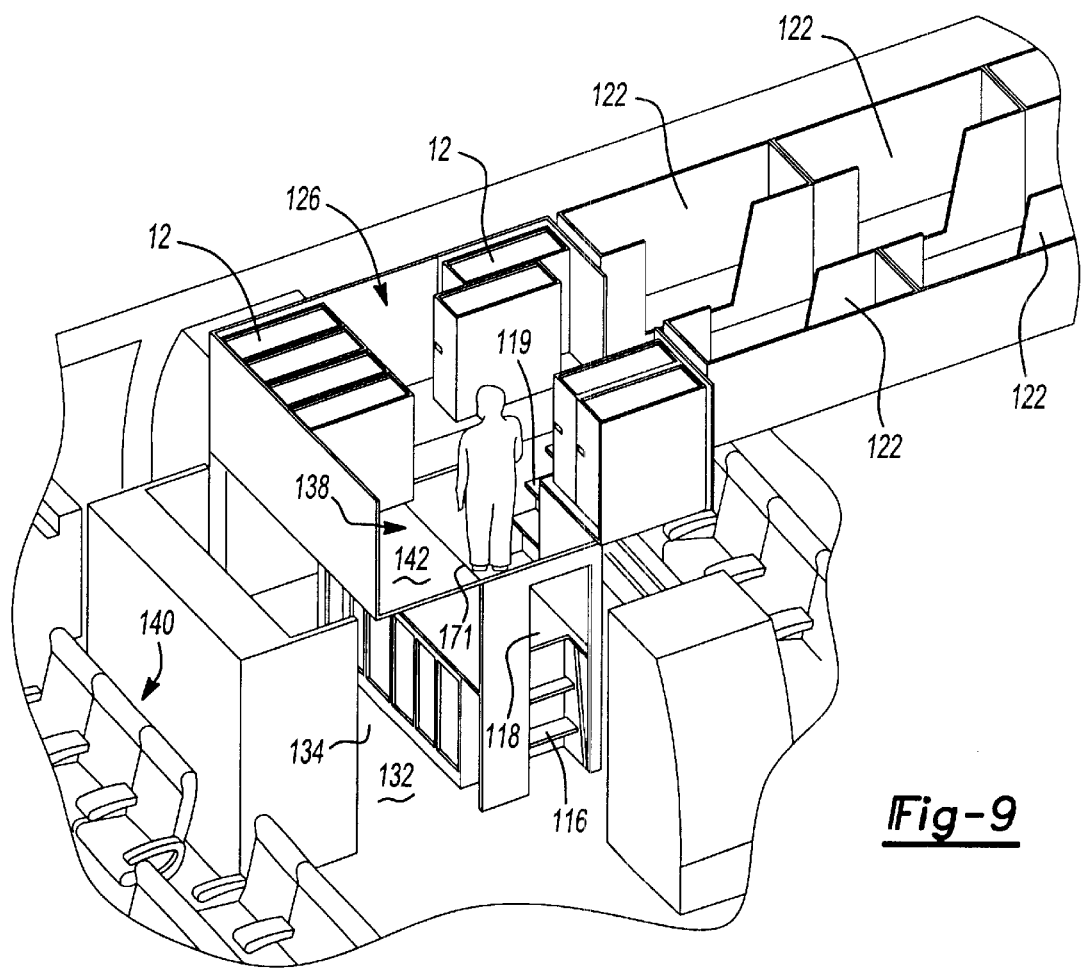
FIG. 9 is a perspective view illustrating an overhead galley/crew rest system according to yet another alternative embodiment of the present invention.

Referring now to FIGS. 7–9, an alternative embodiment of the present invention is illustrated, generally indicated at 110. According to this embodiment, raised galley storage system 110 is capable of conveniently and reliably storing a plurality of conventional galley carts 12 in a galley cart storage area 114. Preferably, galley cart storage area 114 is refrigerated to provide proper food keep.

Raised galley storage system 110 further includes a stairway entry 116, an raised walkway 118, and a cart lift system 126, which are all disposed in an aircraft 28. As best seen in FIG. 7, stairway entry 116 of raised galley storage system 110 generally extends from main deck 132 to raised walkway 118. Stairway entry 116 is generally sized to permit safe and convenient ingress and egress to raised section 138 by the flight crew. Raised walkway 118 is preferably disposed generally above an existing galley 134 adjacent a passenger compartment 140. However, the walking surface of raised walkway 118 is positioned below a pair of galley cart support surfaces 142, upon which galley carts 12 are placed. Accordingly, such arrangement enables the available headroom of raised walkway 118 to be maximized while further maximizing the headroom existing galley 134. However, it should be understood that the particular dimensions of raised galley storage system 110 might be easily changed depending on the customer's needs and/or preferences.

Accordingly, depending on these dimensions, the overhead galley attendant could work either in a standing position or a seated position.

During operation, galley carts 12 are preferably stored in refrigerated galley cart storage area 114. Galley carts 12 would be locked down within galley cart storage area 114 in a conventional main deck means to inhibit damaging movement during flight. To facilitate raising and lowering galley carts 12 from raised section 138 to main deck 132 of aircraft 28, cart lift system 126 is employed. Specifically, to remove galley cart 12 from galley cart storage area 114, a manually sliding trolley 164 is employed. Sliding trolley 164 includes a base 166 longitudinally slidably on rails 171. Base 166 generally is a flat platform for accommodating galley cart 12 thereon. Base 166 is disposed generally coplanar with galley cart support surfaces 142. Galley cart support surfaces 142 interface with cart lift system 126 to permit smooth and convenient rolling of galley cart 12 to cart lift system 126.

To this end, sliding trolley 164 is manually slid such that base 166 is generally coplanar with galley cart support surfaces 142 of galley cart storage area 114 to define a relatively flat rolling surface that spans raised walkway 118. Galley cart 12 is then unlocked from galley cart storage area 114 and manually rolled across to base 166 and, preferably yet optionally, locked to prevent rolling. Sliding trolley 164 is then slid back to cart lift system 126 at which time it is lowered by cart lift system 126. The lowering of galley cart 12 via cart lift system 126 may be manual or automatic. That is, galley cart 12 may be lowered using a manual pulley system or an automated drive mechanism, such as a motor driven pulley or screw drive and the like. To raise galley cart 12 to raised section 138, an opposite operation is performed. Moreover, it is anticipated that sliding trolley 164 may be used as the lower support structure of cart lift system 126, such that sliding trolley 164 and galley cart 12 are simply slid into cart lift system 126 and lowered as a single unit. Still further, it is anticipated that sliding trolley 164 may be indexed to each cart location of galley cart storage area 114 such that galley cart 12 may remain locked to sliding trolley 164 without the need for rolling.

In the event, cart lift system 126 functions improperly, galley carts 12 may still be removed from raised galley storage system 110 using stairway entry 116. It is also anticipated that galley carts 12 may be stored on multiple sliding trolleys 164 over raised walkway 118 to increase storage capacity. Still further, it is anticipated that movement of sliding trolley 164 may be motorized to reduce crew fatigue.

As best seen in FIG. 8, it is anticipated that multiple banks of galley carts 12 may be stored in a stacked fashion in a galley cart storage area 214 to permit additional storage efficiency to be realized.

As illustrated in FIG. 9, a plurality of sleeping berths 122 may be disposed on opposing sides of a secondary raised walkway 119, which is accessible via a second stairway 117 from raised walkway 118. It should be appreciated that by positioning the plurality of sleeping berths 122 down past galley cart storage area 114 enables galley carts 12 and the like to be accessed without disturbing crew in the crew rest facility.

Figure 11:
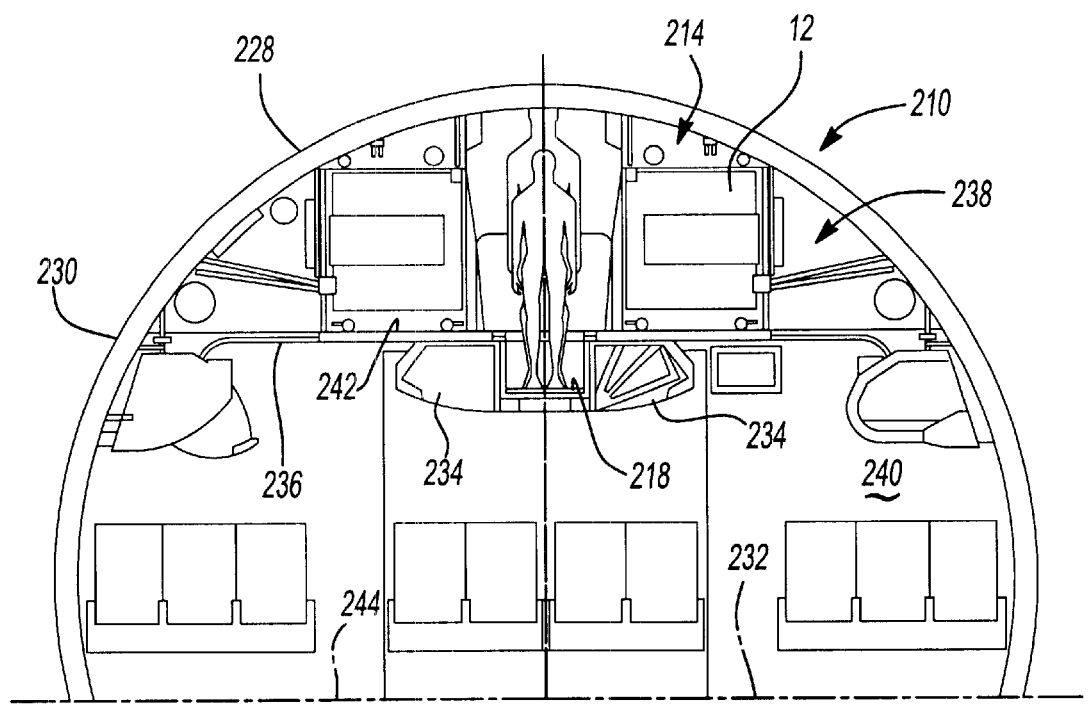
FIG. 11 is a partial cross-section view illustrating the overhead galley/crew rest system of FIG. 10.
Figure 3:
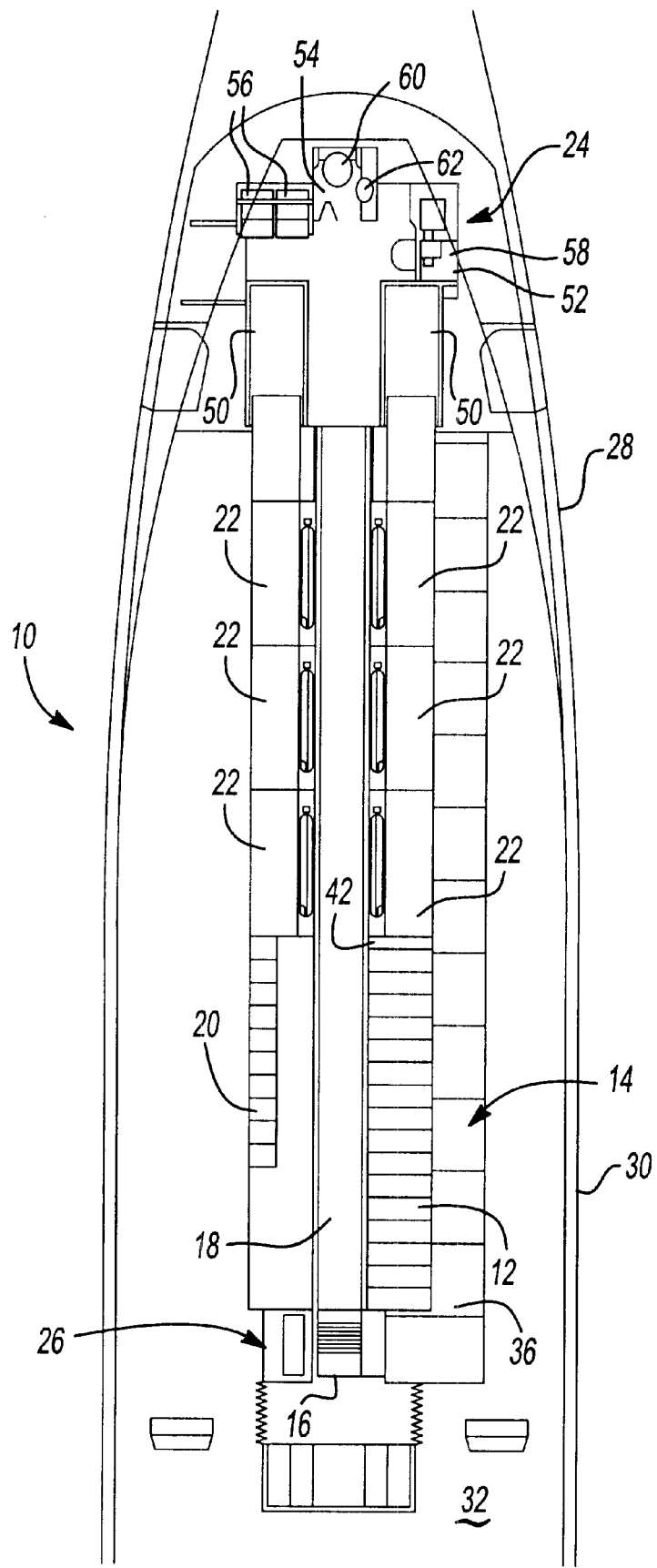
FIG. 3 is a plan view illustrating the overhead galley/crew rest system.
Figure 10:
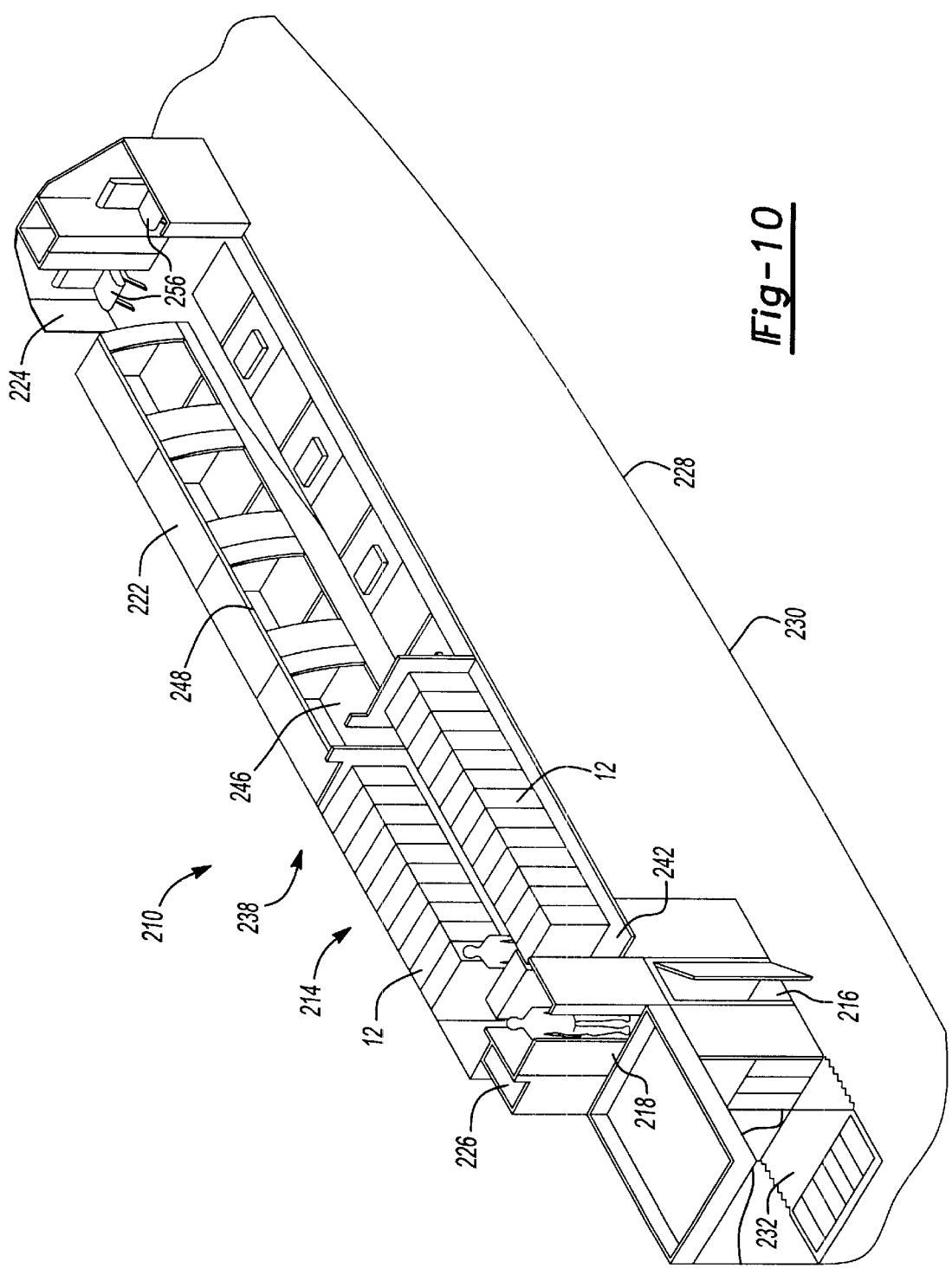
FIG. 10 is a perspective view illustrating an overhead galley/crew rest system according to still yet another alternative embodiment of the present invention.
Figure 12:
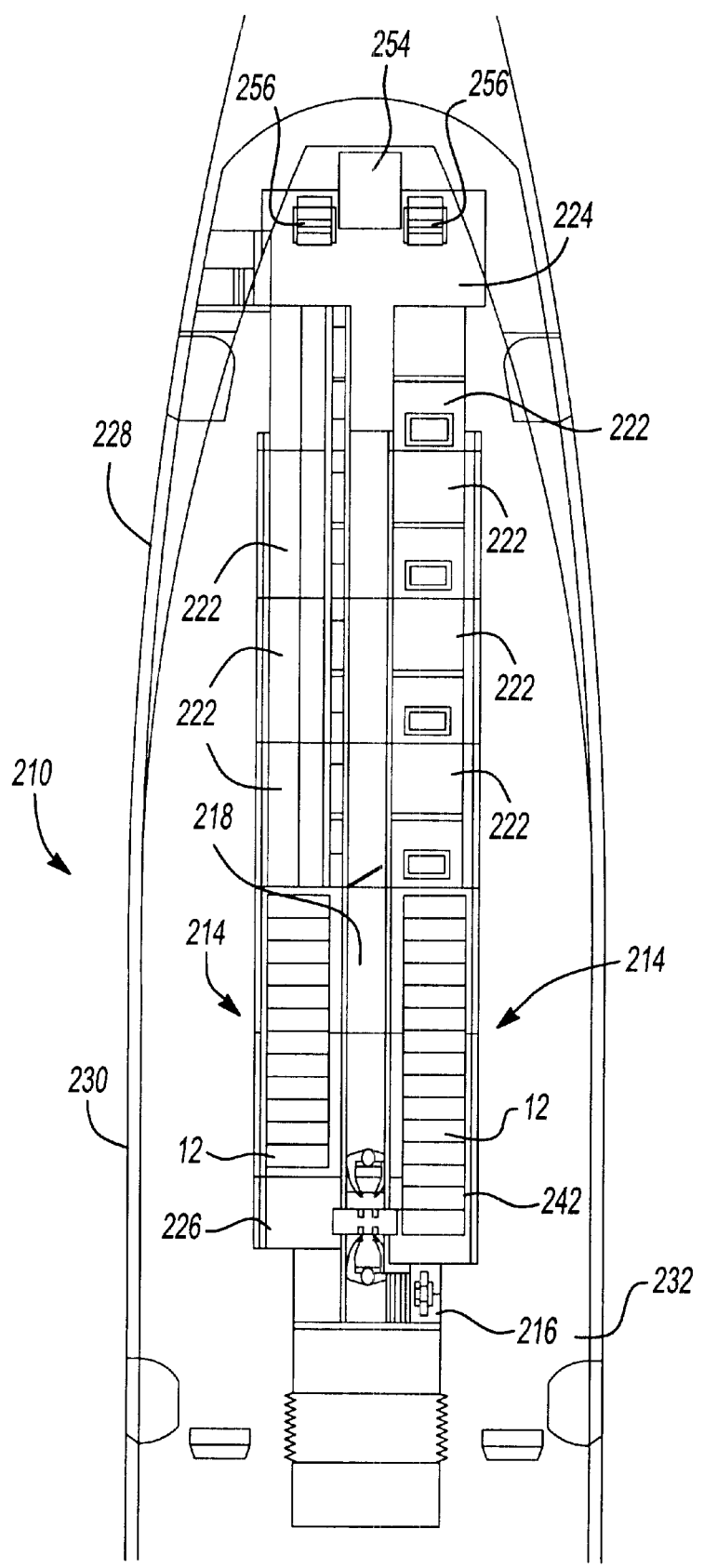
FIG. 12 is a plan view illustrating the overhead galley/crew rest system of FIG. 10.

Referring now to FIGS. 10–12, an alternative embodiment of the present invention is illustrated, generally indicated at 210. According to this embodiment, overhead galley/crew rest system 210 is capable of conveniently and reliably storing a plurality of conventional galley carts 12 in a galley cart storage area 114. The particular component parts of raised galley storage system 210 is similar to overhead galley/crew rest system 10. Therefore, in the interest of brevity, further description is not deemed necessary. It should be noted that like reference numbers, which employ a 200 series prefix, indicate like parts.

The present invention being thus described provides a manually accessible overhead galley and crew rest facility that is capable of relocating a plurality of galley carts and crew rest facilities from the main deck of the aircraft to a previously unused overhead section. Relocation of these galley carts and crew rest facilities provides additional space for passenger seating on the main deck of the aircraft. By way of non-limiting example, it has been realized that the present invention enables approximately twelve additional seats to be placed in an economy section of a Boeing 747-400 or approximately ten additional seats to be placed in an economy section of a Boeing 777. It should be understood that over the life span of a Boeing 777, ten additional seats generate approximately $4 billion in added revenue.

The simplicity of the present invention further provides economies to be realized in maintenance, cleanliness, and weight. Furthermore, the present invention is easily bypassed through the various stairways so as not to prevent food service to the aircraft passengers. The combination of simplicity, low weight, low cost, high reliability, manual backup, minimal operational impact, minimal ground turn-around impact, and the ability to use standard galley carts proves the present invention should be widely accepted.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An aircraft comprising:

a body;

a main passenger cabin disposed in said body for accommodating a plurality of seats, said main passenger cabin having a plurality of storage binds disposed along a generally planar ceiling portion thereof;

an overhead section disposed in said body, said overhead section being positioned generally above said ceiling portion of said main passenger cabin;

a galley cart storage area disposed in said overhead section capable of storing a plurality of galley carts, said galley cart storage area defines a generally planar cart plane;

a walkway generally extending along said overhead section, said walkway being generally positioned between said plurality of storage binds, said walkway further being generally positioned below said generally planar cart plane;

a stairway interconnecting said main passenger cabin and said walkway;

a cart lift interconnecting said main passenger cabin to said overhead section, said cart lift being operable to individually raise and lower the plurality of galley carts; and a cart transferring mechanism disposed in said overhead section, said cart transferring mechanism capable of supporting at least one of the plurality of galley carts between said generally planar cart plane and said cart lift.

2. The aircraft according to claim 1, further comprising:

a plurality of sleeping compartments disposed in said overhead section, said plurality of sleeping compartments being positioned generally on opposing sides of said walkway.

3. The aircraft according to claim 2, further comprising:

a workstation disposed in said overhead section, said workstation being positioned generally at an end of said walkway.

4. The aircraft according to claim 3, further comprising:

a lavatory disposed in said overhead section, said lavatory being positioned generally at an end of said walkway.

5. The aircraft according to claim 1 wherein said cart lift mechanism comprises:

a motor; and a lifting mechanism coupled to said motor to automatically raise and lower the plurality of galley carts.

6. The aircraft according to claim 5 wherein said cart lift mechanism comprises a manually operated lifting mechanism to manually raise and lower the plurality of galley carts.

7. An aircraft comprising:

a body;

a main passenger cabin disposed in said body for accommodating a plurality of seats, said main passenger cabin having a plurality of storage binds disposed along a generally planar ceiling portion thereof;

an overhead storage section disposed in said body, said overhead storage section being positioned generally above said ceiling portion of said main passenger cabin;

a galley cart storage area disposed in said overhead storage section capable of storing a plurality of galley carts, said galley cart storage area defines a generally planar cart plane;

a walkway generally extending along said overhead storage section, said walkway being generally positioned between said plurality of storage binds, said walkway further being generally positioned below said generally planar cart plane;

a stairway interconnecting said main passenger cabin and said walkway;

a plurality of sleeping compartments disposed in said overhead storage section, said plurality of sleeping compartments being positioned generally on opposing sides of said walkway;

a cart lift mechanism interconnecting said main passenger cabin to said overhead storage section, said cart lift mechanism being operable to individually raise and lower the plurality of galley carts; and a cart transferring mechanism disposed in said overhead storage section, said cart transferring mechanism capable of supporting at least one of the plurality of galley carts between said generally planar cart plane and said cart lift.

8. The aircraft according to claim 7, further comprising:

a workstation disposed in said overhead storage section, said workstation being positioned generally at an end of said walkway.

9. The aircraft according to claim 8, further comprising:

a lavatory disposed in said overhead storage section, said lavatory being positioned generally at an end of said walkway.

10. The aircraft according to claim 9 wherein said cart lift mechanism comprises:

a motor; and a lifting mechanism coupled to said motor to automatically raise and lower the plurality of galley carts.

11. The aircraft according to claim 9 wherein said cart lift mechanism comprises a manually operated lifting mechanism to manually raise and lower the plurality of galley carts.

12. An aircraft comprising:

a body;

a main passenger cabin having a plurality of storage binds disposed along a ceiling thereof;

an overhead section disposed in said body generally above said ceiling of said main passenger cabin;

a galley cart storage area disposed in said overhead section capable of storing a plurality of galley carts;

a walkway generally extending along said overhead section, said walkway being generally positioned between said plurality of storage binds;

a cart lift interconnecting said main passenger cabin to said overhead section, said cart lift mechanism being operable to individually raise and lower the plurality of galley carts; and a cart transferring mechanism disposed in said overhead section, said cart transferring mechanism capable of supporting at least one of the plurality of galley carts between said galley cart storage area and said cart lift.

13. The aircraft according to claim 12, further comprising:

a plurality of sleeping compartments disposed in said overhead section, said plurality of sleeping compartments being positioned generally on opposing sides of said walkway.

14. The aircraft according to claim 12, further comprising:

a workstation disposed in said overhead section, said workstation being positioned generally at an end of said walkway.

15. The aircraft according to claim 12, further comprising:

a lavatory disposed in said overhead section, said lavatory being positioned generally at an end of said walkway.

16. The aircraft according to claim 12 wherein said cart lift mechanism comprises:

a motor; and a lifting mechanism coupled to said motor to automatically raise and lower the plurality of galley carts.

17. The aircraft according to claim 16 wherein said cart lift mechanism comprises a manually operated lifting mechanism to manually raise and lower the plurality of galley carts.

* * * * *

UNITED STATES PATENT AND TRADEMARK OFFICE
CERTIFICATE OF CORRECTION

PATENT NO.    : 6,464,169 B1                                              Page 1 of 1
DATED         : October 15, 2002
INVENTOR(S)   : Johnson et al.

It is certified that error appears in the above-identified patent and that said Letters Patent is hereby corrected as shown below:

<u>Title page,</u>
Item [57], ABSTRACT,
Lines 3 and 13, "binds" should be -- bins --.
Line 19, "pursuer's's" should be -- purser's --.

<u>Column 1,</u>
Line 58, "binds" should be -- bins --.

<u>Column 2,</u>
Line 1, "binds" should be -- bins --.
Line 8, "pursuer's's" should be -- purser's --.

<u>Column 3,</u>
Line 62, "is" should be -- be --.

<u>Column 6,</u>
Lines 42 and 53, "binds" should be -- bins --.

<u>Column 7,</u>
Lines 28 and 42, "binds" should be -- bins --.

<u>Column 8,</u>
Lines 20 and 29, "binds" should be -- bins --.

Signed and Sealed this

Seventeenth Day of June, 2003

JAMES E. ROGAN
*Director of the United States Patent and Trademark Office*